United States Patent [19]

Hradcovsky et al.

[11] 4,238,556

[45] Dec. 9, 1980

[54] LEAD-ACID CELL

[76] Inventors: Rudolf J. Hradcovsky; Otto R. Kozak, both of 27 W. Beech St., Long Beach, N.Y. 11561

[21] Appl. No.: 66,164

[22] Filed: Aug. 13, 1979

[51] Int. Cl.³ ............................................. H01M 10/08
[52] U.S. Cl. .................................... 429/190; 429/198; 429/204
[58] Field of Search ............... 429/198, 204, 205, 225, 429/228, 190

[56] References Cited

U.S. PATENT DOCUMENTS

| | | | |
|---|---|---|---|
| 668,356 | 2/1901 | Placet | 429/217 |
| 3,928,066 | 12/1975 | Lewenstein | 429/204 X |

*Primary Examiner*—Anthony Skapars
*Attorney, Agent, or Firm*—Michael Ebert

[57] ABSTRACT

A lead-acid storage battery having a lead negative electrode, a lead dioxide positive electrode and a sulfuric acid electrolyte having an organic catalyst dissolved therein which prevents dissolution of the electrodes into lead sulfate whereby in the course of discharge, the lead dioxide is reduced to lead oxide and the lead is oxidized.

5 Claims, No Drawings

LEAD-ACID CELL

BACKGROUND OF INVENTION

This invention relates generally to lead-acid storage batteries, and more particularly to an electrolyte for such batteries which significantly improves the operating characteristics thereof.

Battery cells are referred to as "primary" batteries when they generate electrical current directly at the expense of chemical energy and can be renewed only by the replacement of the used-up materials. In a storage or "secondary" cell, the chemical changes which occur in furnishing current can be reversed by forcing current through the cell in the proper direction. In the charging process, chemicals which were used up in the ordinary running of the cell are manufactured anew. The most widely used secondary battery is the lead-acid cell; for its low cost, reliability and favorable performance characteristics render it acceptable for many different applications.

The lead-acid storage battery is manufactured in various sizes, ranging in capacity from less than one ampere-hour to several thousand ampere-hours. The most popular storage battery is the lead-acid automotive battery which is used for automobile starting, ignition and lighting, this battery having a moderate capacity, and a high-rate and low temperature performance.

In a lead-acid battery, use is made of a highly-reactive sponge lead for the negative electrode or cathode and lead dioxide as the active positive or anode electrode, a sulfuric acid solution serving as the electrolyte. As the battery discharges, the active material of both electrodes are converted into lead sulfate. Taking part in this reaction is the sulfuric acid electrolyte which, as the battery discharges, produces water. In the recharging process, the reverse action takes place. In the recharging process, the reverse action takes place. By measuring the specific gravity of the electrolyte, one can determine the state of charge, for the specific gravity decreases on discharge and increases on charge.

The discharge and charge reactions of the lead-acid cell are defined by the following expression:

$$Pb + PbO_2 + 2H_2SO_4 \rightleftarrows 2\,PbSO_4 + H_2O$$

in which the arrow to the right indicates the discharge reaction and that to the left the charge reaction. At the end of the charge, electrolysis of water also occurs, generating hydrogen at the cathode and oxygen at the anode.

The overall lead cathode reaction is given by the expression;

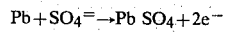

$$Pb + SO_4^= \rightarrow PbSO_4 + 2e^-$$

The overall anode reaction is given by the expression:

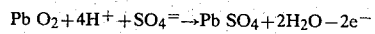

$$PbO_2 + 4H^+ + SO_4^= \rightarrow PbSO_4 + 2H_2O - 2e^-$$

A pasted-plate design is commonly used in the construction of a lead-acid cell. The active material for each electrode is prepared as a paste by mixing divided lead oxides and suitable expander materials with sulfuric acid. The paste is spread onto a lead-alloy grid which affords the structure to hold the active materials as well as the necessary electrical conductivity. The resultant plates are then soldered to connecting straps to create negative and positive groups which are interleaved. To complete the assembly, separators are placed between the electrodes, the assembly then being housed within a container that is designed to include a sediment space under the assembly to collect any active material that is dislodged therefrom, as well as headroom above the assembly to hold excess electrolyte.

Conventional lead-acid batteries for automotive applications employ antimonial-lead grids to impart adequate strength to the thin grid structure and to facilitate casting. In recently-developed versions of such batteries, use is made of calcium-lead grids which are more resistant to corrosion and self-discharge. For applications other than automobiles, the lead-acid batteries are generally similar in design but differ in their lead-alloy composition, plate thickness, separators and containers in order to optimize the performance characteristics for the particular application.

Among the limitations of a lead-acid storage battery are its poor low-temperature characteristics and its loss of capacity on standing. It is well known that a lead-acid battery permitted to remain in a discharged state for more than six months will become "sulfated" and thereby difficult to discharge. Moreover, because of the relatively large amount of sulfuric acid included in conventional storage batteries, in the event of an accident resulting in spillage, this acid may become hazardous.

SUMMARY OF INVENTION

In view of the foregoing, the main object of this invention is to provide a lead-acid storage cell whose electrolyte is such that sulfation does not occur, the cell operating electrochemically on the principle of reduction-oxidation.

More particularly, it is an object of this invention to provide a lead-acid storage battery of a given capacity which uses far less sulfuric acid than conventional batteries and is therefore less hazardous than such batteries, the acid having an organic catalyst dissolved therein whereby the lead dioxide electrode of the battery is reduced electrolytically in the course of discharge.

Also an object of the invention is to provide a lead-acid storage battery having good low-temperature characteristics and capable of remaining in the discharged state for a prolonged period without significantly impairing its ability to be recharged.

Briefly stated in a lead-acid storage battery in accordance with the invention, the sulfuric acid electrolyte has dissolved therein an organic catalyst which prevents dissolution of the electrodes into lead sulfate whereby in the course of discharge the lead dioxide electrode is reduced to lead oxide and the lead electrode is oxidized to produce lead oxide, the electrodes having the same composition in the discharged state and regaining their original composition on recharge. In a preferred embodiment of the cell glass wool separators are provided between the electrodes which are saturated with the electrolyte.

DESCRIPTION OF INVENTION

Inasmuch as a lead-acid storage cell in accordance with the invention behaves electrochemically in a manner comparable to a nickel-cadmium cell, we shall first consider the behavior of nickel-cadmium cells.

The active materials in a charged nickel-cadmium cell are trivalent nickel oxide for the positive and cadmium for the negative electrode. The alkaline electrolyte is a solution of potassium hydroxide. A simplified statement of the cell reaction is as follows:

$$Cd + 2Ni\,OOH + 2H_2O \rightleftharpoons Cd(OH)_2 + 2\,Ni(OH)_2$$

Thus during discharge, the nickel oxide is reduced to the divalent state while the cadmium is oxidized, this electrochemical process being reversed in charging.

Unlike a lead-acid cell, the performance of a nickel-cadmium cell is good at low-temperatures and the battery can be stored in either the charged or discharged condition without damage. Also reasonable overcharging of a nickel-cadmium cell has no detrimental effect thereon. However, a nickel cadmium cell has a nominal voltage of only 1.2 volts as compared to the 2 volts of a lead-acid cell. Also its internal resistance is much higher than that of a lead-acid cell.

Because of its very low internal resistance, much more current can be drawn from a lead-acid cell than from a nickel-cadmium cell, a factor which as a practical matter rules out the use of nickel-cadmium cells as storage batteries for automotive applications which require a heavy starting current.

A lead-acid storage battery in accordance with the invention makes use of sponge-lead for the negative and lead dioxide for the positive electrode, the same as in conventional cells. However, the sulfuric acid electrolyte has dissolved therein an organic catalyst which prevents dissolution of the electrodes in the sulfuric acid into lead sulfate and functions to bring about a reduction-oxidation electrochemical action comparable to that occurring in an alkaline cell.

Thus in the course of discharge, the lead dioxide positive is reduced to lead oxide while the lead negative is oxidized to form lead oxide. In recharging, the process is reversed. No lead sulfate is produced in a lead-acid battery in accordance with the invention, for only water takes part in the electrochemical process while the acid functions to render the electrolyte conductive.

The following are examples of electrolytes suitable for use in lead-acid storage batteries in accordance with the invention.

EXAMPLE I

In 100 cm$^3$ of H$_2$SO, 80% concentration, the following ingredients are added:

(a) 15 grams of nitrocellulose (approximately $C_6H_7O_2(ONO_2)_3$) and (b) 2.5 grams of synthetic or natural camphor ($C_{10}H_{16}O$).

After these ingredients are dissolved in the H$_2$SO$_4$, the acid is diluted to the required specific gravity (15–30 Be).

EXAMPLE II

In 100 cm$^3$ of H$_2$SO$_4$, 80% concentration, the following ingredient is added:

20 grams of "Celluloid". This trademark refers to a plastic consisting essentially of a solid solution of cellulose nitrate and camphor or other plasticizer.

After the Celluloid is dissolved, the H$_2$SO$_4$ is diluted to the required specific gravity.

Modifications

With respect to example I, in which the ingredients added to the sulfuric acid are (a) nitrocellulose and (b) camphor, a first modification is to use 20 grams of (a) and 5 grams of (b). A second modification is to use 5 grams of (a) and 10 grams of (b) and a third modification is to use 2 grams of (a) and 2 grams of (b). The procedure is otherwise the same as in example I.

With respect to example II, a first modification is to use 5 grams of Celluloid, and a second modification is to use 20 grams of Celluloid, the procedure being otherwise the same.

In place of conventional separators between the electrodes, use may be made of glass wool or a fiber-glass mat soaked with an acid electrolyte containing the organic catalyst in accordance with the invention. It becomes possible with this arrangement to use far less sulfuric acid than in conventional lead acid battery. Indeed, the amount of acid required is reduced to one fourth of conventional requirements, thereby improving the safety factor of the battery. Because of the greatly reduced amount of acid required and the fact that the acid is held in mats, the dangers and burns which attend spillage of the electrolyte in the event of accident are greatly reduced.

By providing separators in the form of a mixture of silica gel and glass wool soaked in an electrolyte in accordance with the invention, it becomes possible to construct what amounts to a dry cell having a very low internal resistance, for the electrolyte is adsorbed by the gel and becomes paste-like as in a dry battery.

And because the electrolyte in a lead-acid battery in accordance with the invention does not give rise to sulfation of the electrodes and a depreciation of their active mass, the cell has a much longer effective working life, good low temperature characteristics and other advantages heretofore realized only in alkaline batteries but without the current limitations of alkaline batteries.

While there have been shown and described preferred embodiments of a lead-acid cell in accordance with the invention, it will be appreciated that changes and modifications may be made therein without, however, departing from the essential spirit thereof.

We claim:

1. A lead-acid storage cell comprising a lead negative electrode, a lead dioxide positive electrode, and an electrolyte constituted by a sulfuric acid solution having a catalyst dissolved therein formed by an organic substance constituted by a cellulosic compound which prevents sulfation of the electrodes and results, during the discharge of the cell, in reduction of the positive electrode and oxidation of the negative electrode.

2. A cell as set forth in claim 1, wherein said catalyst is constituted by nitrocellulose and camphor.

3. A cell as set forth in claim 1, wherein said catalyst is constituted by cellulose nitrate and camphor.

4. A cell as set forth in claim 1, wherein said cell further includes glass wool separators between said electrodes saturated with said electrolyte.

5. A cell as set forth in claim 4, wherein said glass wool further includes silica gell to absorb said electrolyte and thereby provide a dry battery.

* * * * *